(12) United States Patent
Tanno

(10) Patent No.: US 8,859,124 B2
(45) Date of Patent: Oct. 14, 2014

(54) INTEGRATED CIRCUIT AND BATTERY PACK USING THE SAME

(75) Inventor: Yoshikatsu Tanno, Fukushima (JP)

(73) Assignee: Sony Corporation, Tokyo (JP)

( * ) Notice: Subject to any disclaimer, the term of this patent is extended or adjusted under 35 U.S.C. 154(b) by 865 days.

(21) Appl. No.: 12/622,086

(22) Filed: Nov. 19, 2009

(65) Prior Publication Data

US 2010/0129700 A1     May 27, 2010

(30) Foreign Application Priority Data

Nov. 21, 2008    (JP) ................. 2008-297744

(51) Int. Cl.
    *H01M 10/48*       (2006.01)
    *H02J 7/00*         (2006.01)
    *H01M 10/44*       (2006.01)

(52) U.S. Cl.
    CPC ........... *H02J 7/0031* (2013.01); *H01M 10/482* (2013.01); *Y02E 60/12* (2013.01); *H01M 10/441* (2013.01); *H02J 2007/004* (2013.01)
    USPC ............................................. 429/93; 320/134

(58) Field of Classification Search
    None
    See application file for complete search history.

(56) References Cited

U.S. PATENT DOCUMENTS

| | | | |
|---|---|---|---|
| 5,742,148 A * | 4/1998 | Sudo et al. ................... | 320/134 |
| 6,118,255 A | 9/2000 | Nagai et al. | |
| 2004/0109274 A1 * | 6/2004 | Sato ............................ | 361/90 |

FOREIGN PATENT DOCUMENTS

| | | |
|---|---|---|
| CN | 1667912 | 9/2005 |
| EP | 1339154 | 8/2003 |
| JP | 2003-282153 | 10/2003 |
| JP | 2005-168160 | 6/2005 |

OTHER PUBLICATIONS

Search Report mailed Oct. 21, 2010, corresponding to Singapore Appln. No. 200906695-2.
State Intellectual Property Office of People's Republic of China, Notification of Third Office Action issued in connection with Chinese Application No. 200910222894.8, dated Jul. 30, 2013. (13 pages).

* cited by examiner

*Primary Examiner* — Ula C Ruddock
*Assistant Examiner* — Lisa S Park Gehrke
(74) *Attorney, Agent, or Firm* — K&L Gates LLP

(57) ABSTRACT

An integrated circuit includes: a voltage detection means for detecting a voltage to be applied between the positive electrode and the negative electrode of one or a plurality of secondary batteries; a power supply means for generating a predetermined voltage; an input terminal to which a voltage value according to the value of a current flowing in the secondary battery is input; and a control means configured such that, when the predetermined voltage is input from the power supply means, an overcharge detection signal or an overdischarge detection signal is output in accordance with the voltage detected by the voltage detection means, and when the predetermined voltage is not input from the power supply means, a charge control signal or a discharge control signal is output in accordance with the voltage detected by the voltage detection means or the voltage value to be input to the input terminal.

11 Claims, 10 Drawing Sheets

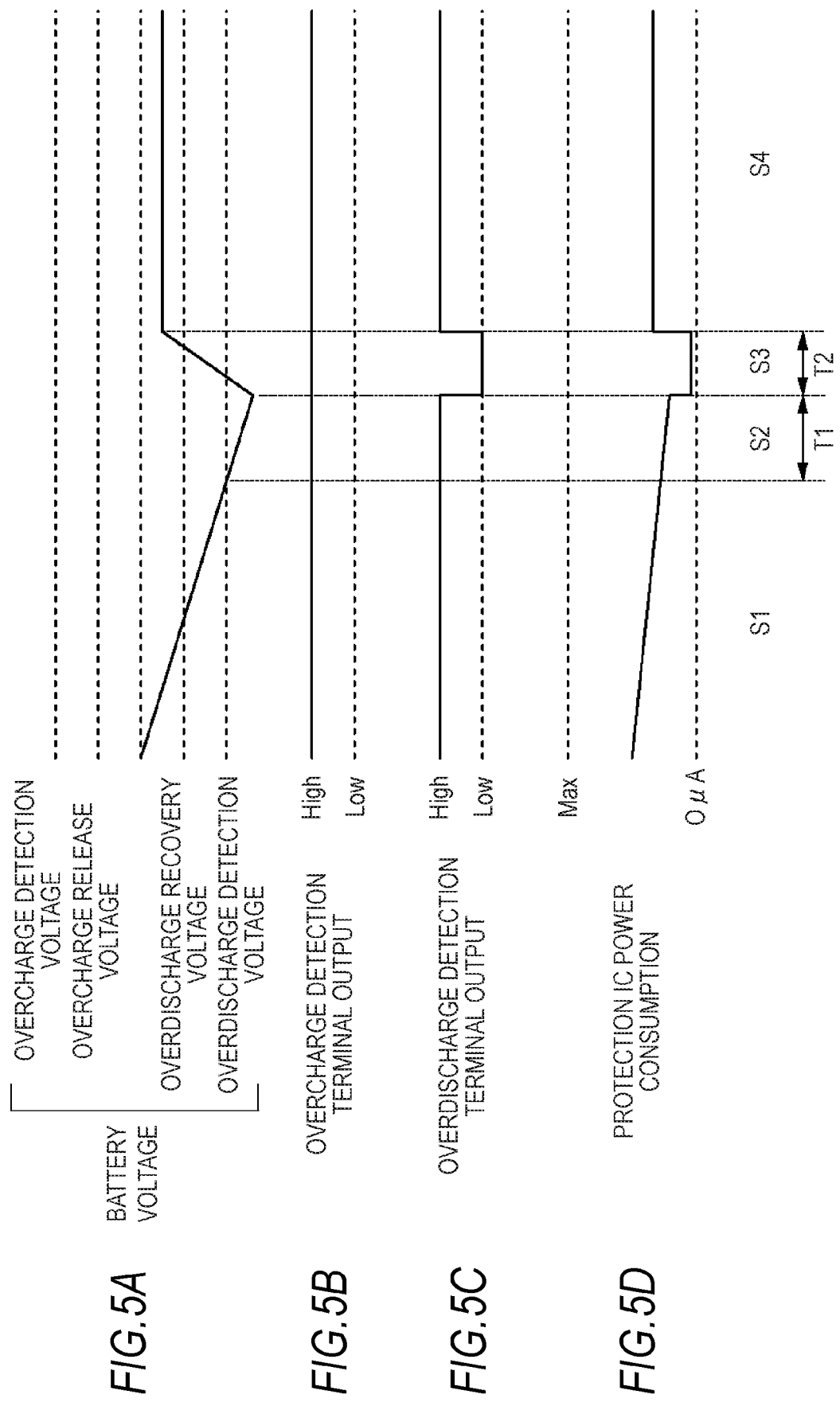

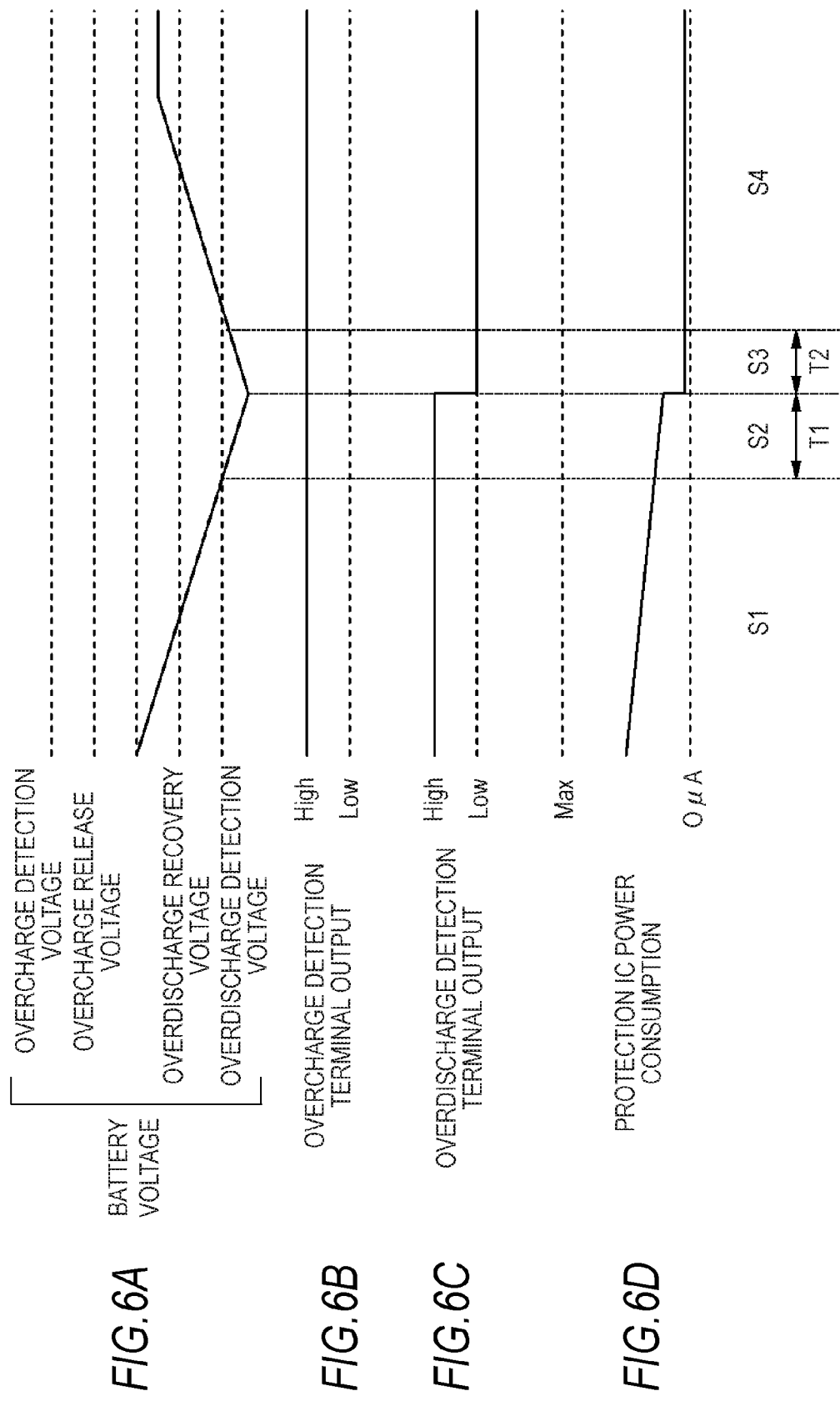

INTEGRATED CIRCUIT AND BATTERY PACK USING THE SAME

CROSS REFERENCES TO RELATED APPLICATIONS

The present application claims priority to Japanese Priority Patent Application JP 2008-297744 filed in the Japan Patent Office on Nov. 21, 2008, the entire contents of which is hereby incorporated by reference.

BACKGROUND

The present application relates to an overcharge/overdischarge protection integrated circuit and a battery pack using the same. In particular, the present application relates to an overcharge/overdischarge protection integrated circuit which is capable of being used for detection of an overcharge/overdischarge voltage, or detection and control of an overcharge/overdischarge voltage, and to a battery pack using the same.

At present, many electronic apparatuses which are used with a battery have mounted therein a battery pack using a chargeable secondary battery. The secondary battery is charged when the battery pack is mounted to a charger. Electronic apparatuses are also used in which, in a state where a battery pack is mounted in the electronic apparatus, an AC adapter is connected to the electronic apparatus so as to charge the secondary battery.

As described in JP-A-2003-282153, with regard to the charge/discharge control of the battery pack, typically, the voltage of the secondary battery is monitored, and when a predetermined voltage set in advance is detected, the charge or discharge control is performed. For example, a charge control FET (Field Effect Transistor) and a discharge control FET are provided in the battery pack. Then, when an integrated circuit (hereinafter, appropriately referred to as protection IC (Integrated Circuit)) detects a voltage which indicates the full charge state of the secondary battery, the charge control FET is controlled so as to stop the charge current. Similarly, when a voltage which indicates an overdischarge state is detected, the discharge control FET is controlled so as to stop the charge current. In this way, the protection IC detects the voltage of the secondary battery and controls the charge/discharge control FET so as to perform current control, so voltage detection and current control of the secondary battery in the battery pack can be performed.

A method is also known in which a voltage detector detects the voltage of the secondary battery and transmits the battery voltage to the charger or the electronic apparatus. In this case, a control circuit provided in the charger or the electronic apparatus monitors the transmitted battery voltage so as to perform charge/discharge control.

SUMMARY

With the method using the voltage detector, when the voltage detector detects the voltage which indicates the overdischarge state, current control is performed by the control circuit of the charger or the electronic apparatus. However, the voltage detector is not powered down even after the current control has been performed and continues to perform voltage detection. For this reason, while there is no problem in the case of the overcharge state, in the case of the overdischarge state, there is further progression in the overdischarge state due to current consumption in the IC of the voltage detector. This causes a decrease in the battery voltage to 0 V when the battery pack is left unused for a long time, which, for example, may cause an internal short-circuit, and make the battery unable to be used. Further, unnecessary power consumption is not cut, and power consumption of the battery pack increases, so the battery may be deteriorated and lifespan of the battery is shortened.

The method of controlling the charge/discharge control FET by using the protection IC and the method using the voltage detector may be selected in accordance with the specification of the electronic apparatus. In this case, different components will be used in accordance with the adopted method, so it is difficult to reduce manufacturing costs.

Accordingly, there is a need for an overcharge/overdischarge protection integrated circuit which can stop current consumption when an overdischarge state is detected and can be used regardless of the current control mechanism of a battery pack, and for a battery pack using the same.

An embodiment provides an integrated circuit. The integrated circuit includes a voltage detection means for detecting a voltage to be applied between the positive electrode and the negative electrode of one or a plurality of secondary batteries, a power supply means for generating a predetermined voltage, an input terminal to which a voltage value according to the value of a current flowing in the secondary battery is input, and a control means configured such that, when the predetermined voltage is input from the power supply means, an overcharge detection signal or an overdischarge detection signal is output in accordance with the voltage detected by the voltage detection means, and when the predetermined voltage is not input from the power supply means, a charge control signal or a discharge control signal is output in accordance with the voltage detected by the voltage detection means or the voltage value to be input to the input terminal.

In this integrated circuit, after the overcharge state or an overcurrent state during charging (hereinafter, appropriately referred to as a charge overcurrent state) is detected, the overcharge detection signal or the charge control signal is output with its output level changed. Further, when the overdischarge state or an overcurrent state during discharging (hereinafter, appropriately referred to as a discharge overcurrent state) is detected, the overdischarge detection signal or the discharge control signal is output with its output level changed.

In the above-described integrated circuit, when a first predetermined time has elapsed after the overdischarge state or the discharge overcurrent state has been detected, the output level of the overdischarge detection signal or the discharge control signal may be changed, then the control means may control the voltage of the power supply means so as to perform control such that power consumption is substantially zero.

In the above-described integrated circuit, when a second predetermined time has elapsed after the voltage of the power supply means has been controlled such that power consumption is substantially zero, if the voltage detected by the voltage detection means falls within a predetermined range, the output level of the overdischarge detection signal or the discharge control signal may be changed, and the control means may perform control such that the voltage of the power supply means is restored.

Another embodiment provides a battery pack. The battery pack includes an assembled battery configured to have one or a plurality of secondary batteries, and a protection circuit configured to have an integrated circuit for controlling charge/discharge of the secondary battery and first and second external connection terminals. The integrated circuit includes a voltage detection means for detecting a voltage to be applied between the positive electrode and the negative electrode of one or a plurality of secondary batteries, a power supply means for generating a predetermined voltage, an input terminal to which a voltage value according to the value of a current flowing in the secondary battery is input, and a control means configured such that, when the predetermined voltage is input from the power supply means, an overcharge detection signal or an overdischarge detection signal is output in accordance with the voltage detected by the voltage detection means, and when the predetermined voltage is not input from the power supply means, a charge control signal or a discharge control signal is output in accordance with the voltage detected by the voltage detection means or the voltage value to be input to the input terminal.

When it is configured such that the predetermined voltage is input from the power supply means, the above-described battery pack may further include a first output terminal configured to output the charge control signal to the outside, and a second output terminal configured to output the discharge control signal to the outside. Further, when it is configured such that the predetermined voltage is not input from the power supply means, the above-described battery pack may further include a charge controller configured to control a charge current in accordance with the charge control signal, a discharge controller configured to control a discharge current in accordance with the discharge control signal, a resistor configured to detect a current value.

In the above-described battery pack, after the overcharge state or the charge overcurrent state has been detected, the control means may output the overcharge detection signal or the charge control signal with its output level changed. Further, after the overdischarge state or the discharge overcurrent state has been detected, the control means may output the overdischarge detection signal or the discharge control signal with its output level changed. When this happens, the charge current and the discharge current are cut off.

In the above-described battery pack, when a first predetermined time has elapsed after the overdischarge state or the discharge overcurrent state has been detected, the output level of the overdischarge detection signal or the discharge control signal may be changed, then the control means may control the voltage of the power supply means so as to perform control such that the power consumption of the integrated circuit is substantially zero.

In the above-described battery pack, when a second predetermined time has elapsed after the voltage of the power supply means has been controlled such that power consumption of the integrated circuit is substantially zero, if the voltage detected by the voltage detection means falls within a predetermined range, the integrated circuit may change the output level of the charge control signal or the output level of the discharge control signal to restore the voltage of the power supply means such that a chargeable/dischargeable state is set.

In the above-described battery pack, when a second predetermined time has elapsed after the voltage of the power supply means has been controlled such that power consumption of the integrated circuit is substantially zero, if the voltage detected by the voltage detection means does not fall within a predetermined range, the control means may control the voltage of the power supply means until the first and second external connection terminals are connected to or disconnected from an external apparatus, and the voltage detected by the voltage detection means falls within a predetermined range so as to perform control such that power consumption of the integrated circuit is substantially zero.

Power consumption in the integrated circuit being substantially zero refers to, for example, power consumption sufficient so that the integrated circuit can detect whether or not the battery voltage has reached a recovery voltage, for example. In this case, power consumption is, for example, 1.0 µA or less.

According to an embodiment, in accordance with presence/absence of the input of a predetermined voltage to the control means, a single integrated circuit can use either a mode in which charge/discharge control is performed in the battery pack, or a mode in which a detection signal which indicates the detection of the overcharge state or the overdischarge state is output to an electronic apparatus connected. Further, when the overcharge state or the overdischarge state is maintained for a predetermined time or more, a power-down mode can be put into operation.

According to an embodiment, the integrated circuit can be used regardless of the current control mechanism of the battery pack, and manufacturing costs can be reduced. Further, the power consumption of the battery pack can be suppressed, and the lifespan of the battery pack during long-term storage can be extended.

Additional features and advantages are described herein, and will be apparent from the following Detailed Description and the figures.

BRIEF DESCRIPTION OF THE FIGURES

FIGS. 5A to 5D are timing charts when a voltage is restored to a recovery voltage in a predetermined time in the first embodiment.

FIGS. 6A to 6D are timing chart when a voltage is not restored to a recovery voltage in a predetermined time in the first embodiment.

DETAILED DESCRIPTION

The present application will be described with reference to the drawings according to an embodiment.

(1) First Embodiment

Figure 1:
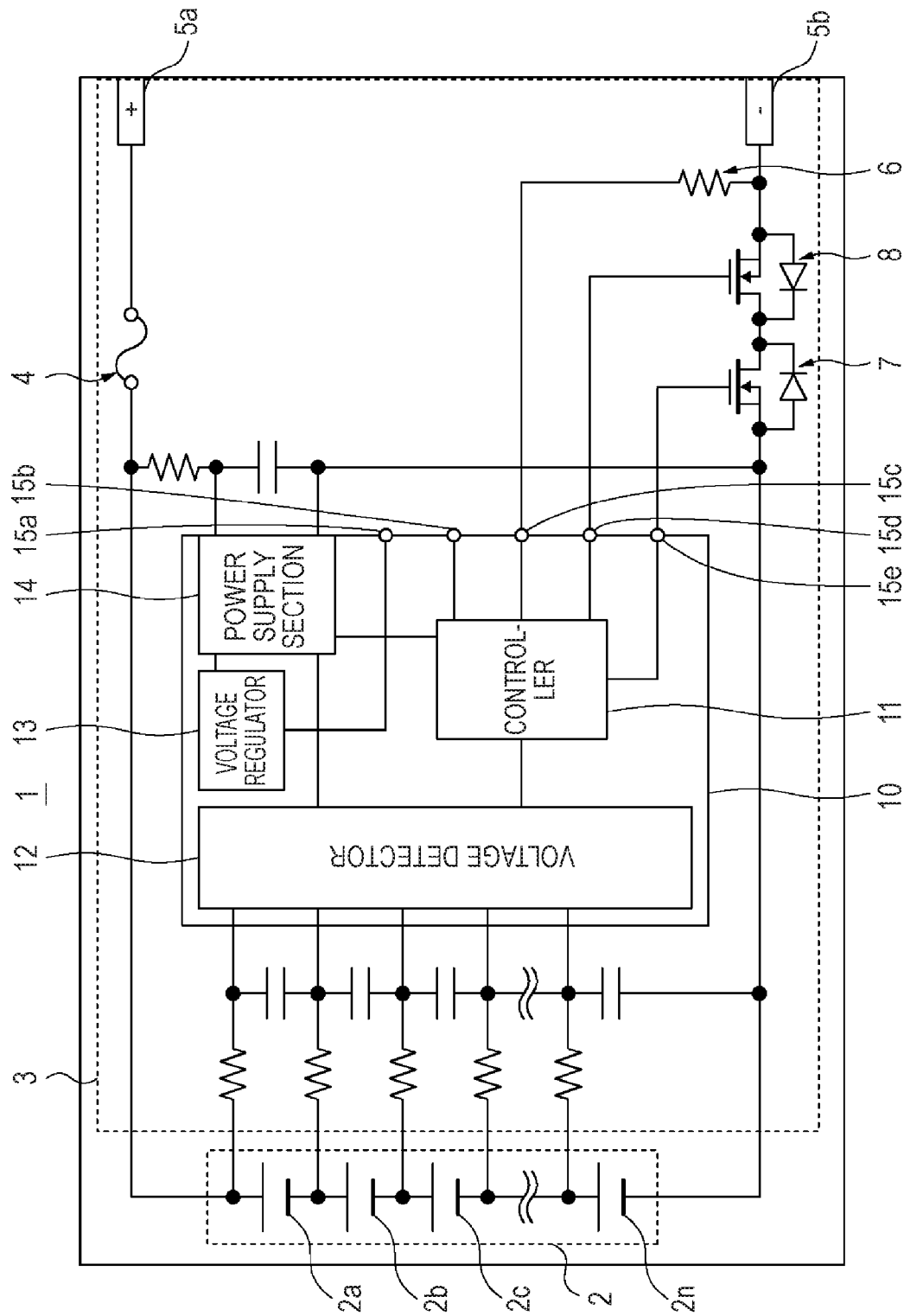
FIG. 1 is a block diagram showing an example of the circuit configuration of a battery pack according to a first embodiment.
Figure 2:
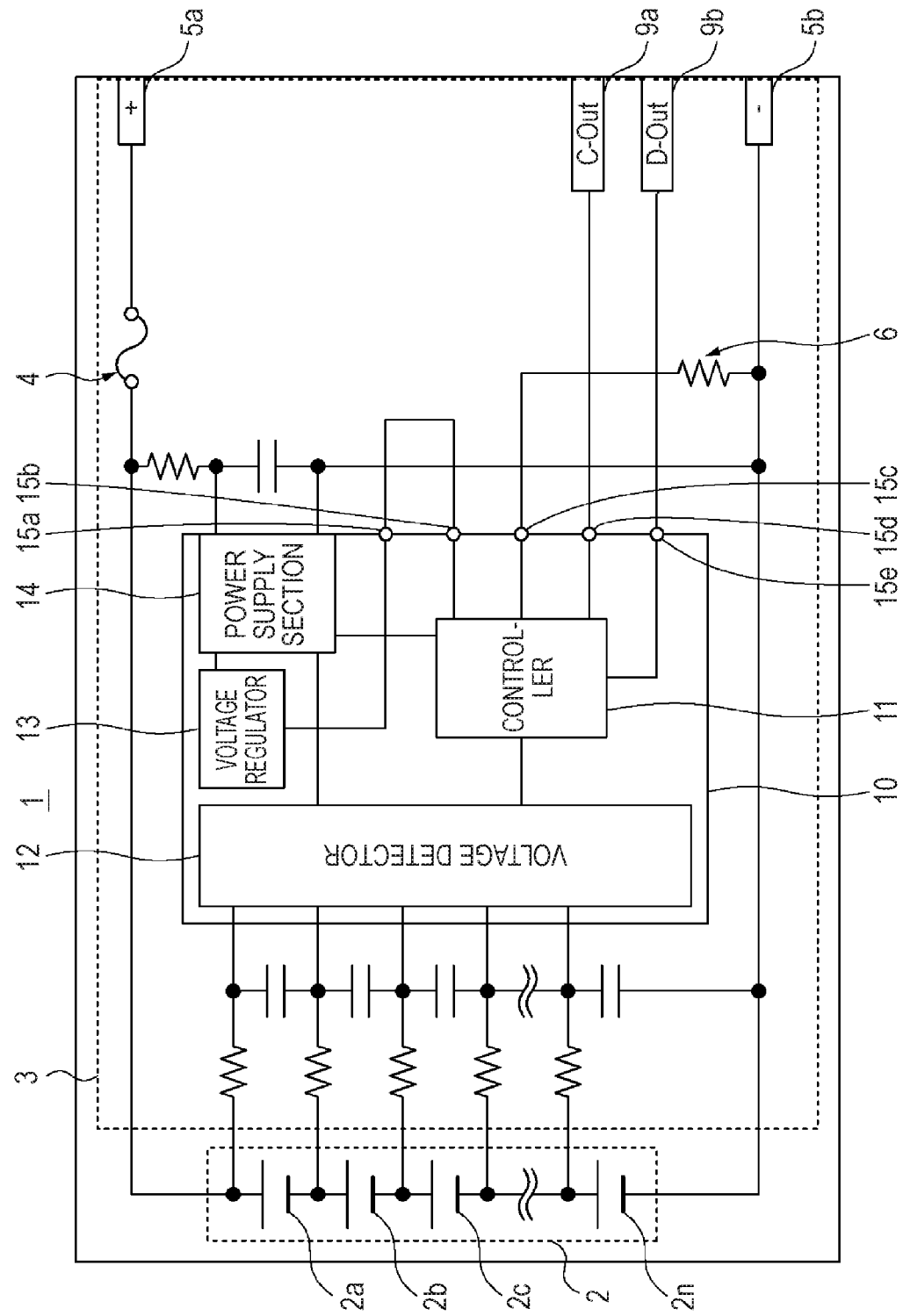
FIG. 2 is a block diagram showing an example of the circuit configuration of the battery pack according to the first embodiment.

FIGS. 1 and 2 show examples of the configuration of a battery pack according to an embodiment. FIG. 1 shows the configuration in which in a battery pack 1, the voltage and overcurrent of each of secondary batteries 2a to 2n are detected, and voltage control and current control are performed. Hereinafter, the configuration of FIG. 1 in which control is performed in the battery pack is appropriately called a protection IC mode. FIG. 2 shows the configuration in which the voltage of each of secondary batteries is detected in a battery pack, and the voltage detection result is output to an electronic apparatus, a charger, or the like (hereinafter, appropriately called an electronic apparatus or the like). The configuration of FIG. 2 in which the voltage of each of the secondary batteries is detected in the battery pack, and control is performed by the electronic apparatus on the basis of the detected voltage is appropriately called a voltage detector mode.

[Overall Configuration of Battery Pack]

The battery pack 1 has an assembled battery 2 which has n secondary batteries 2a to 2n connected to each other in series. The secondary batteries 2a to 2n are connected to a circuit board 3. The circuit board 3 is provided with a protection IC 10 which detects the voltage of each of the secondary batteries 2a to 2n and performs control in the battery pack 1 or transmits the voltage value to the outside of the battery pack 1.

(1-1) Configuration and Operation of Circuit Board

The circuit board 3 is provided with a plus terminal 5a and a minus terminal 5b, which are contacts for connection to an electronic apparatus or the like, in addition to a fuse 4 and the protection IC 10. At the time of charging, a charger, such as an AC adapter or the like, is connected to the plus terminal 5a and the minus terminal 5b, and charging is carried out. When an electronic apparatus is used, the plus terminal 5a and the minus terminal 5b are connected to the plus terminal and the minus terminal of the electronic apparatus, and discharging is carried out.

The fuse 4 is connected in series to the secondary batteries 2a to 2n. If an overcurrent flows in the secondary batteries 2a to 2n, the fuse 4 is melted down by a current flowing therein so as to cut off the current. A heater resistor (not shown) is provided near the fuse 4. The heater resistor increases in temperature when an overvoltage is applied and the fuse 4 is melted down so as to cut off the current.

In the case of the protection IC mode, an overcurrent state detection resistor 6 for overcurrent detection, a discharge control FET (Field Effect Transistor) 7 for discharge control, and a charge control FET 8 for charge control are provided. In the case of the voltage detector mode, charge/discharge control is performed by an electronic apparatus or the like connected to the battery pack 1, so the charge control FET 8 and the discharge control FET 7 do not need to be provided. In the case of the voltage detector mode, an overcharge detection signal output terminal 9a and an overdischarge detection signal output terminal 9b are provided. The overcharge detection signal output terminal 9a outputs a signal which indicates the battery pack 1 is in an overcharge state to an electronic apparatus or the like, and the overdischarge detection signal output terminal 9b outputs a signal which indicates the battery pack 1 is in an overdischarge state to an electronic apparatus or the like. The overcharge detection signal output terminal 9a and the overdischarge detection signal output terminal 9b are formed as contacts, like the plus terminal 5a and the minus terminal 5b. When the battery pack 1 and an electronic apparatus or the like are connected to each other, an overcharge detection signal which indicates an overcharge voltage and an overdischarge detection signal which indicates an overdischarge voltage can be input to the control circuit of the electronic apparatus.

The circuit board 3 may have mounted thereon an ID (Identification) resistor or the like which is used to identify the battery pack (not shown). The overcurrent state detection resistor 6 may be provided when the protection IC 10 is put in the voltage detector mode.

Hereinafter, the protection IC 10 which can switch the functions in the protection IC mode and the voltage detector mode will be described.

[Protection IC]

The protection IC 10 has a controller 11, a voltage detector 12, a voltage regulator 13, a power supply section 14, and terminals. The terminals include a regulator output terminal 15a, a mode switching terminal 15b, an overcurrent detection terminal 15c, an overcharge detection terminal 15d, and an overdischarge detection terminal 15e. Hereinafter, description will be given for the respective sections.

The voltage detector 12 detects the voltage of each of the secondary batteries 2a to 2n, and outputs the detected voltage to the controller 11. The voltage regulator 13 is formed by, for example, a series regulator. The voltage regulator 13 controls a voltage generated by the power supply section 14 to a predetermined voltage and supplies the voltage to the outside. In the case of the voltage detector mode, the voltage regulator 13 supplies the predetermined voltage to the controller 11 through the regulator output terminal 15a and the mode switching terminal 15b. The power supply section 14 supplies the generated voltage to the voltage regulator 13, the controller 11, and the voltage detector 12. It is assumed that the respective sections of the protection IC 10 are constantly operating in a normal state other than a power-down mode. When it is detected that the battery voltage is equal to or more than an overcharge voltage or equal to or less than an overdischarge voltage, the protection IC 10 is put in the power-down mode such that power consumption is controlled. When it is detected that the battery voltage is equal to or less than the overdischarge voltage, and the power-down mode has been put into operation, it is preferable that the sections of the protection IC 10 carry out only an operation to detect whether or not each of the secondary batteries 2a to 2n has reached a predetermined recovery voltage. The power-down mode of the protection IC 10 is put into operation by the power supply section 14 under the control of the controller 11.

The controller 11 has a function to control the charge control FET 8 and the discharge control FET 7 in accordance with the detected current and voltage and a function to output the detected voltage to the electronic apparatus. These functions can be selectively used. In the protection IC mode where current/voltage control is performed in the battery pack 1, the controller 11 detects the voltage of each of the secondary batteries 2a to 2n and the current flowing in the battery pack 1. Then, the controller 11 controls the charge control FET 8 and the discharge control FET 7 in accordance with the detected current and voltage.

The voltage detector mode and the protection IC mode are switched depending on whether or not a predetermined voltage is input to the mode switching terminal 15b provided in the protection IC 10.

Figure 3:
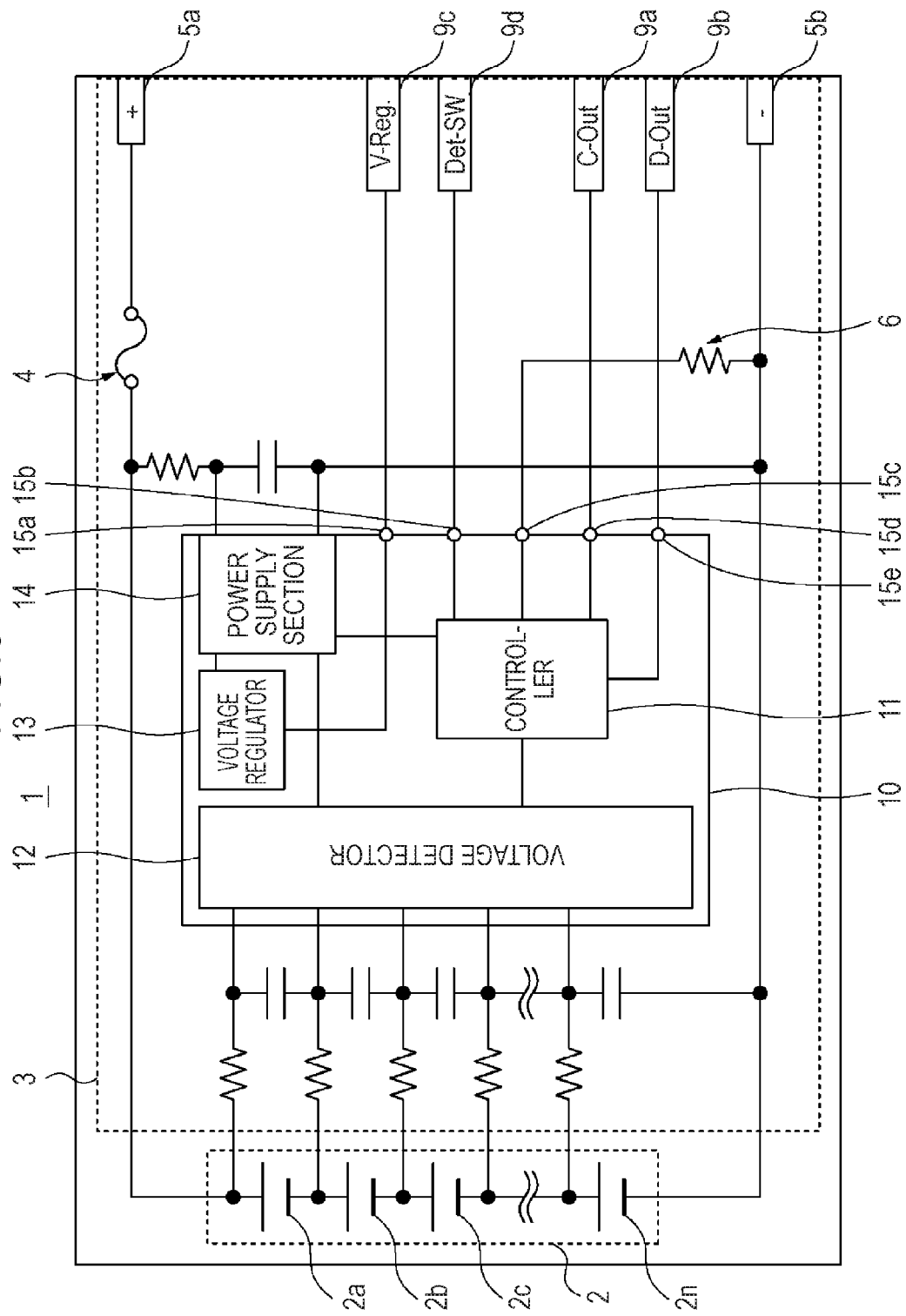
FIG. 3 is a block diagram showing an example of the circuit configuration of another battery pack.

If the regulator output terminal 15a and the mode switching terminal 15b are electrically connected to each other, a predetermined voltage (for example, 5 V) is input from the voltage regulator 13 to the controller 11 through the regulator output terminal 15a and the mode switching terminal 15b. In this case, the controller 11 allows an operation in the voltage detector mode. As shown in FIG. 3, there are provided a regulator external output terminal 9c electrically connected to the regulator output terminal 15a, and a mode switching external terminal 9d electrically connected to the mode switching terminal 15*b*. The regulator external output terminal 9*c* and the mode switching external terminal 9*d* are connected to an electronic apparatus or the like. With the configuration of FIG. 3, when the battery pack 1 and an electronic apparatus are connected to each other, the regulator output terminal 15*a* and the mode switching terminal 15*b* are electrically connected to each other. Though not shown, when an electronic apparatus and the battery pack 1 are connected to each other, configuration may be made such that a predetermined voltage generated by an electronic apparatus is input to the controller 11 through the mode switching terminal 15*b*.

If it is configured such that the regulator output terminal 15*a* and the mode switching terminal 15*b* are not electrically connected to each other, no voltage is input to the controller 11. In this case, the controller 11 allows an operation in the protection IC mode.

[In Case of Voltage Detector Mode]

When the protection IC 10 is used in the voltage detector mode, the controller 11 operates so as to "output the detected battery state to the electronic apparatus". In this case, as shown in FIG. 2, while the charge control FET 8 and the discharge control FET 7 do not need to be provided in the battery pack 1, the voltage detector 12 needs to be provided. In the voltage detector mode, charge/discharge control is not performed in the battery pack 1. For this reason, the overcurrent state detection resistor 6 does not need to be provided. In the voltage detector mode, the controller does not detect the current value. Thus, in the voltage detector mode, low power consumption can be realized.

In the voltage detector mode, the controller 11 determines whether or not the detected voltage is an overcharge voltage or an overdischarge voltage. Then, when it is determined that the overcharge voltage or the overdischarge voltage has been detected, an overcharge detection signal or an overdischarge detection signal is output from the controller 11 to the electronic apparatus or the like connected to the battery pack 1. When the electronic apparatus or the like receives either detection signal, current control is performed by using the control circuit of the electronic apparatus. When this happens, a charge current or a discharge current of the battery pack 1 can be controlled.

In the voltage detector mode, a signal which indicates an actual voltage value may be constantly or regularly output to the electronic apparatus or the like. When a voltage value is output, the controller of the electronic apparatus or the like monitors the input voltage value. Then, the controller of the electronic apparatus or the like detects an overcharge voltage or an overdischarge voltage, and current control is performed. When this happens, a current flowing in the battery pack 1 can be controlled. With regard to an overcurrent, as described above, a current flowing in the electronic apparatus is detected by the control circuit of the electronic apparatus or the like, so current control can be performed. For this reason, overcurrent detection is not essentially carried out in the controller 11.

When an overdischarge voltage is detected by the electronic apparatus or the like, control is performed such that the discharge current is cut off by the control circuit of the electronic apparatus. In this case, the discharge current is preferably cut off when a predetermined time has elapsed after the overdischarge voltage has been detected. The controller 11 controls the power supply section 14 so as to put the protection IC 10 in the power-down mode and to suppress power consumption of the protection IC 10. Thereafter, when the voltage of each of the secondary batteries 2*a* to 2*n* reaches a recovery voltage higher than the overdischarge voltage in a predetermined time, the normal mode is restored in which discharge can be carried out again.

When the voltage of each of the secondary batteries 2*a* to 2*n* does not reach the recovery voltage in the predetermined time, the power-down mode is maintained. Then, after the electronic apparatus serving as a load is disconnected or the battery pack is connected to the charger, and the voltage of each of the secondary batteries 2*a* to 2*n* reaches the recovery voltage, the normal mode is restored in which charge and discharge can be carried out. With this configuration, even if overdischarge is detected, it is possible to eliminate a problem such that there is further progression in the overdischarge state due to continuous power consumption of the protection IC 10 in the voltage detector mode.

"The protection IC 10 will be put in the power-down mode" means that the voltage to be generated by the power supply section 14 decreases under the control of the controller 11, such that the power consumption in the protection IC 10 is substantially zero, for example, 1.0 μA or less. It is preferable that power consumption in the power-down mode is sufficient so that the protection IC 10 can detect whether or not the battery voltage has reached the recovery voltage.

When the battery pack 1 is in the overcharge state, the charge current is cut off, but the protection IC 10 is not put in the power-down mode. When this happens, the voltage of each of the secondary batteries 2*a* to 2*n* is lower than the overcharge voltage due to current consumption of the protection IC 10 itself, so the battery pack 1 can be safely used.

[In Case of Protection IC Mode]

When the protection IC 10 is used in the protection IC mode with no predetermined voltage input, the controller 11 operates so as to "control the charge/discharge FET in accordance with the detected current and voltage". In this case, as described above, the overcurrent state detection resistor 6, the charge control FET 8, and the discharge control FET 7 are provided in the battery pack 1.

In the protection IC mode, if an overcurrent during charging (hereinafter, appropriately called a charge overcurrent) and an overcharge voltage are detected, the controller 11 outputs a control signal to the charge control FET 8 so as to turn off the charge control FET 8. Thus, the charge current is cut off. Thereafter, the charger is removed, such that the voltage between the plus terminal 5*a* and the overcurrent state detection resistor 6 reaches a predetermined recovery voltage, and when a load, such as an electronic apparatus, is connected to the battery pack 1, the discharge operation is restored. Then, if discharge is performed and the voltage of each of the secondary batteries 2*a* to 2*n* decreases, the normal mode is restored in which the secondary batteries 2*a* to 2*n* can be charged/discharged.

When the overdischarge voltage is detected, the controller 11 outputs a control signal to the discharge control FET 7 so as to turn off the discharge control FET 7. Thus, the discharge current is cut off. After the discharge current has been cut off, the protection IC 10 is in the power-down mode. Thereafter, only when the charger is connected to the battery pack 1, the charge operation is restored. Then, when charging is performed and the voltage of each of the secondary batteries 2*a* to 2*n* reaches the recovery voltage, the normal mode is restored in which the secondary batteries 2*a* to 2*n* can be charged/discharged.

When an overcurrent during discharging (hereinafter, appropriately called a discharge overcurrent) is detected, the controller 11 outputs a control signal to the discharge control FET 7 so as to turn off the discharge control FET 7. Thus, the discharge current is cut off. After the discharge current has been cut off, the protection IC 10 is put in the power-down mode. Thereafter, when a load, such as an electronic apparatus, connected to the battery pack 1 is disconnected, the normal mode is restored in which the secondary batteries 2a to 2n can be charged/discharged.

[Operation of Protection IC]

Figure 4:
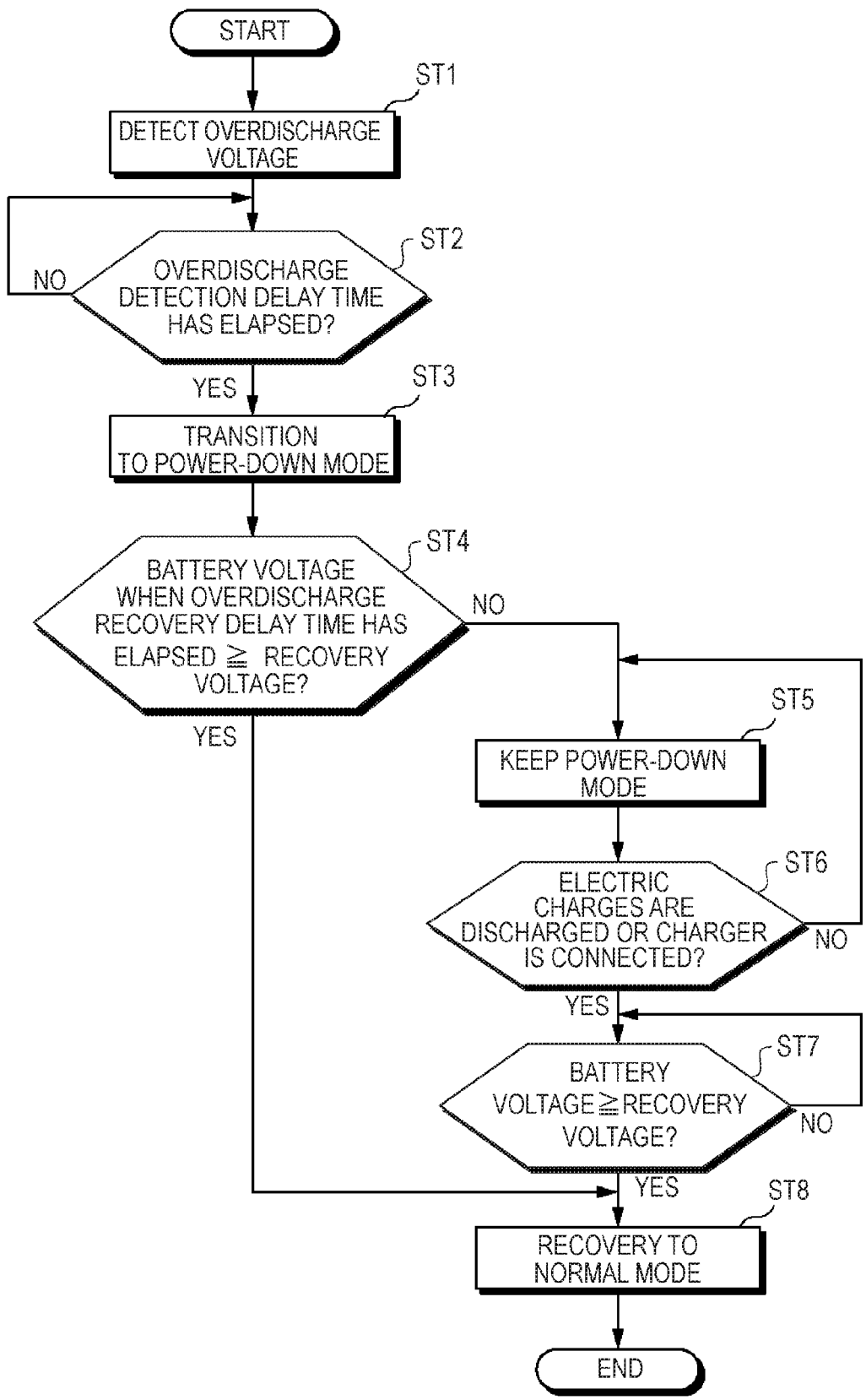
FIG. 4 is a flowchart showing the operation of a controller after detection of an overdischarge voltage in the first embodiment.

Hereinafter, the operation of the protection IC in the voltage detector mode after the overdischarge voltage has been detected will be described with reference to a flowchart of FIG. 4 and graphs of FIGS. 5A to 5D and 6A to 6D. FIGS. 5A to 5D show the battery voltage, the output level of the overcharge detection terminal 15d, the output level of the overdischarge detection terminal 15e, and current consumption of the protection IC 10 when the voltage of each of the secondary batteries is restored to the recovery voltage or more in a predetermined time after the overdischarge voltage has been detected during discharging. FIGS. 6A to 6D show the battery voltage, the output level of the overcharge detection terminal 15d, the output level of the overdischarge detection terminal 15e, and current consumption of the protection IC 10 when the voltage of each of the secondary batteries is restored to the recovery voltage or more in a predetermined time after the overdischarge voltage has been detected during discharging. For ease of explanation, the following description will be provided for a case where one secondary battery (secondary battery 2a) is provided.

The battery pack 1 is connected, for example, to an electronic apparatus, and normal discharging is performed, like the S1 state of FIGS. 5A to 5D and FIGS. 6A to 6D. In this case, as shown in FIGS. 5A and 5D and FIGS. 6A and 6D, the voltage of the secondary battery 2a and power consumption of the protection IC 10 are decreasing. Further, as shown in FIGS. 5B and 5C and FIGS. 6B and 6C, the outputs of the overcharge detection terminal 15d and the overdischarge detection terminal 15e are at H level. In Step ST1 of FIG. 4, if the overdischarge voltage is detected, this causes the S2 state of FIGS. 5A to 5D and FIGS. 6A to 6D. In this case, discharge control is not immediately performed, and the discharge state is maintained until an overdischarge detection delay time T1 set in advance elapses. In the S2 state, discharging is maintained, so the voltage of the secondary battery 2a and power consumption of the protection IC 10 are decreasing.

In Step ST2, it is determined whether or not the overdischarge detection delay time T1 has elapsed. When it is determined in Step ST2 that the overdischarge detection delay time T1 has not elapsed, discharging is maintained. When it is determined in Step ST2 that the overdischarge detection delay time T1 has elapsed, in Step ST3, the protection IC 10 is put in the power-down mode, and the S3 state of FIGS. 5A to 5D and FIGS. 6A to 6D is entered. The transition to the power-down mode is carried out when the control circuit of the electronic apparatus detects that the output of the overdischarge detection terminal 15e is changed from H level to L level, as shown in FIGS. 5C and 6C. Meanwhile, the output of the overcharge detection terminal 15d is maintained at H level. In the S3 state, current consumption in the battery pack 1 is controlled, so the battery voltage increases.

In Step ST4, when an overdischarge recovery delay time T2 set in advance has elapsed, it is determined whether or not the voltage of the secondary battery 2a is equal to or more than a predetermined recovery voltage. When it is determined in Step ST4 that the voltage of the secondary battery 2a is equal to or more than the predetermined recovery voltage, in Step ST8, the normal mode is restored, and as shown in FIGS. 5A to 5D, the S4 state is entered in which charging/discharging can be performed. In this case, as shown in FIG. 5C, the output of the overdischarge detection terminal 15e is changed from L level to H level. The protection IC 10 is restored from the power-down mode to the normal mode, and as shown in FIG. 5D, power consumption of the protection IC 10 increases, as compared with the power-down mode.

When it is determined in Step ST4 that the voltage of the secondary battery 2a is not equal to or more than the predetermined recovery voltage when the overdischarge recovery delay time T2 has elapsed, the process progresses to Step ST6, and as shown in FIG. 6D, the S5 state is caused in which the power-down mode is maintained. When the battery voltage is not restored to the predetermined recovery voltage in the overdischarge recovery delay time T2, a load, such as an electronic apparatus or the like, is disconnected from the battery pack 1, or the charger is connected to the battery pack 1, so the power-down mode is maintained until the voltage of the secondary battery 2a is equal to or more than the recovery voltage. For this reason, in Step ST6, it is determined whether or not the load is disconnected from the battery pack or the charger is connected to the battery pack, and when it is determined that the load is not disconnected from the battery pack or the charger is not connected to the battery pack, the process progresses to Step ST5 and the power-down mode is kept.

When it is determined in Step ST6 that the load is not disconnected from the battery pack or the charger is not connected to the battery pack, in Step ST7, it is determined whether or not the voltage of the secondary battery 2a is equal to or more than the predetermined recovery voltage. When it is determined in Step ST7 that the battery voltage is not equal to or more than the recovery voltage, the process is returned and the voltage of the secondary battery 2a is again determined after a predetermined time. When it is determined in Step ST7 that the battery voltage is equal to or more than the recovery voltage, in Step ST8, the normal mode is restored. In this case, similarly to S3→S4 of the FIG. 5C, the output of the overdischarge detection terminal 15e is changed from L level to H level.

Although in the above-described example, for easy of explanation, a case where one secondary battery is provided has been described, in the case of a battery pack in which a plurality of secondary batteries are provided, the lowest voltage among the voltages of a plurality of secondary batteries is monitored so as to detect overdischarge. Alternatively, the highest voltage among the voltages of a plurality of secondary batteries may be monitored so as to detect overcharge.

As described above, with the protection IC of this embodiment, one protection IC can cope with a mode in which charge/discharge control is performed in the battery pack, and a mode in which a voltage value is output and charge/discharge control is performed in the control circuit of the external electronic apparatus.

(1-2) Configuration of Secondary Battery and Battery Pack

Hereinafter, the configuration of each of the secondary batteries 2a to 2n in the battery pack 1 will be described.

[Configuration of Secondary Battery]

Figure 7A:
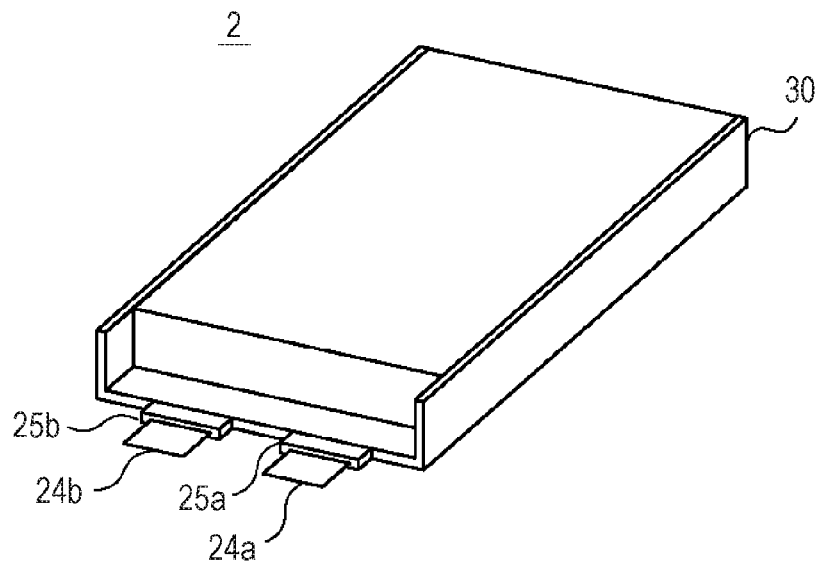
FIGS. 7A and 7B are schematic views showing an example of the configuration of the battery pack according to the first embodiment.
Figure 7B:
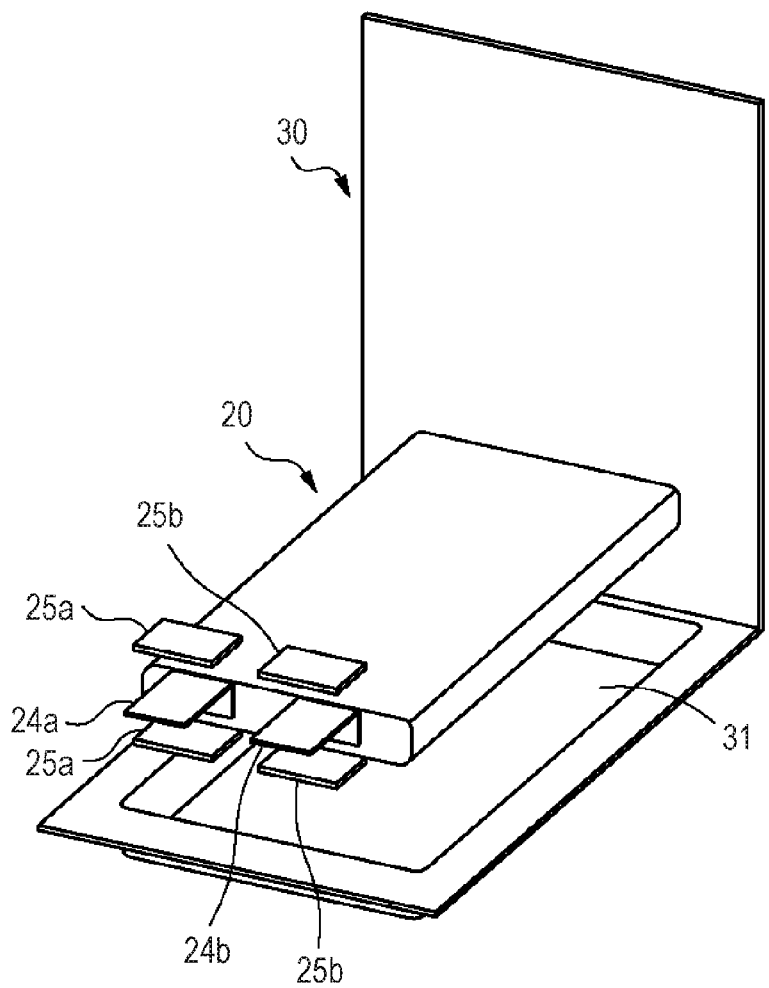
Figure 8:
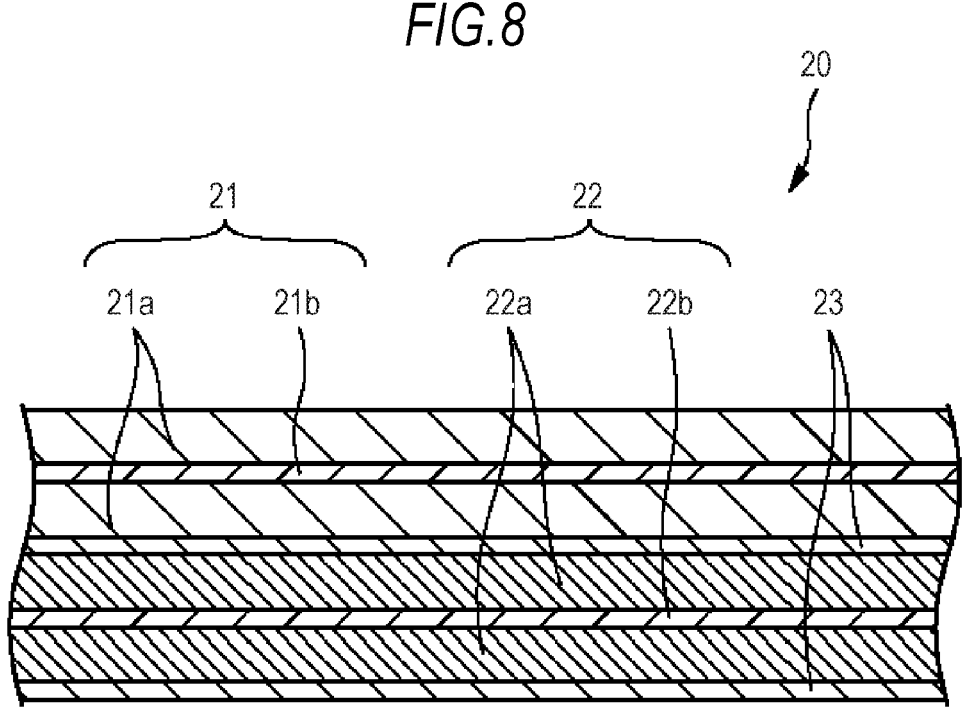
FIG. 8 is a sectional view showing the electrode configuration of a secondary battery according to the first embodiment.
Figure 9:
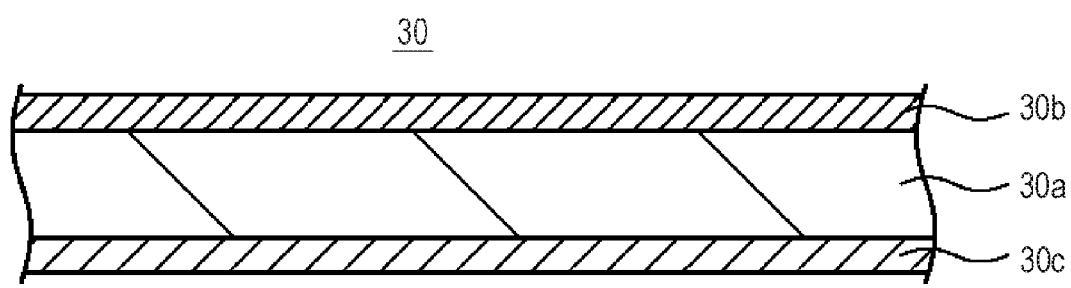
FIG. 9 is a sectional view showing the configuration of a laminated film according to the first embodiment.

FIGS. 7A and 7B show an example of the configuration of the secondary battery 2 in the battery pack 1. FIG. 8 is a sectional view showing an example of the configuration of a battery element 20 which is accommodated in the secondary battery 2. FIG. 9 is a sectional view showing an example of the configuration of a laminated film 30 serving as a packaging member which packages the battery element 20.

The secondary battery 2 is configured such that a strip-shaped positive electrode 21 and a strip-shaped negative electrode 22 disposed opposite the positive electrode 21 are stacked sequentially with a separator 23 interposed therebetween and wound in the longitudinal direction to form the battery element 20, and the battery element 20 is packaged with the laminated film 30. A gel-like electrolyte layer (not shown) is formed on the surfaces of the positive electrode 21 and the negative electrode 22. A positive electrode terminal 24a connected to the positive electrode 21 and a negative electrode terminal 24b connected to the negative electrode 22 are led from the secondary battery 2 (hereinafter, the positive electrode terminal 24a and the negative electrode terminal 24b are appropriately called electrode terminal(s) 24 when a specific terminal is not specified). In order to improve the adhesive property, portions of the positive electrode terminal 24a and the negative electrode terminal 24b which come into contact with the laminated film 30 are packaged with adhesive films 25a and 25b.

[Positive Electrode]

The positive electrode includes a positive electrode current collector 21b, and a positive electrode active material layer 21a which contains a positive electrode active material and which is formed on both surfaces of the positive electrode current collector 21b. The positive electrode current collector 21b is, for example, a metallic foil made of aluminum (Al), nickel (Ni), stainless steel (SUS), or the like.

The positive electrode active material layer 21a contains, for example, a positive electrode active material, a conductor, and a binder. Examples of the positive electrode active material include a composite oxide of lithium and a transition metal, which is mainly made of $Li_xMO_2$ (where M represents at least one transition metal, and x varies depending on the charge/discharge state of the battery and is typically equal to or more than 0.05 and equal to or less than 1.10). Examples of the transition metal constituting the lithium composite oxide include cobalt (Co), nickel (Ni), manganese (Mn), and the like.

Specific examples of the lithium composite oxide include lithium cobaltate ($LiCoO_2$), lithium nickelate ($LiNiO_2$), lithium manganate ($LiMn_2O_4$), and the like. A solid solution obtained by substituting part of the transition metal element with another element may be used. Examples of the solid solution include nickel-cobalt composite lithium oxides ($LiNi_{0.5}Co_{0.5}O_2$, $LiNi_{0.8}Co_{0.2}O_2$, and the like). The lithium composite oxides can generate high voltage and have good energy density. Alternatively, examples of the positive electrode active material include a metal sulfide and a metal oxide not containing lithium, such as $TiS_2$, $MoS_2$, $NbSe_2$, $V_2O_5$, or the like. With regard to the positive electrode active material, these materials may be used in combination.

Examples of the conductor include carbon materials, such as carbon black, graphite, and the like. Examples of the binder include polyvinylidene fluoride (PVdF), polytetrafluoroethylene (PTFE), and the like. Examples of the solvent include N-methyl-2-pyrrolidone (NMP) and the like.

[Negative Electrode]

The negative electrode 22 includes a negative electrode current collector 22b, and a negative electrode active material layer 22a, containing a negative electrode active material, formed on both surfaces of the negative electrode current collector 22b. The negative electrode current collector 22b is, for example, a metallic foil made of copper (Cu), nickel (Ni), stainless steel (SUS), or the like.

The negative electrode active material layer 22a contains, for example, a negative electrode active material, a conductor, and a binder. Examples of the negative electrode active material include lithium metal, a lithium alloy, a carbon material capable of being doped and dedoped with lithium, and a composite material of a metal material and a carbon material. Specific examples of the carbon material capable of being doped and dedoped with lithium include graphite, hardly graphitizable carbon, easily graphitizable carbon, and the like. More specifically, carbon materials, such as pyrolytic carbon, coke (pinch coke, needle coke, or petroleum coke), graphite, glassy carbon, a calcined product of an organic polymer compound (a product obtained by carbonizing phenolic resin, furan resin, or the like by calcination at an appropriate temperature), carbon fiber, activated carbon, and the like, may be used. Examples of the material capable of being doped and dedoped with lithium include a polymer, such as polyacetylene, polypyrrole, or the like, and an oxide, such as $SnO_2$ or the like.

Examples of a material capable of forming an alloy together with lithium include various metals, and among the metals, tin (Sn), cobalt (Co), indium (In), aluminum (Al), silicon (Si), and an alloy thereof are often used. When lithium metal is used, a coating film formed by coating powder along with a binder or a rolled lithium metal plate may be used.

Examples of the binder include polyvinylidene fluoride (PVdF), styrene-butadiene rubber (SBR), and the like. Examples of the solvent include N-methyl-2-pyrrolidone (NMP), methyl ethyl ketone (MEK), and the like.

[Electrolyte]

In the electrolyte, an electrolyte salt and a non-aqueous solvent generally used in a lithium-ion secondary battery may be used. Specific examples of the non-aqueous solvent include ethylene carbonate (EC), propylene carbonate (PC), γ-butyrolactone, dimethyl carbonate (DMC), diethyl carbonate (DEC), ethylmethyl carbonate (EMC), dipropyl carbonate (DPC), ethylpropyl carbonate (EPC), and solvents obtained by substituting hydrogen in the carbonate esters with halogen. These solvents may be used individually, or a plurality of solvents may be mixed according to a predetermined composition.

Examples of the electrolyte salt include an electrolyte salt soluble in the non-aqueous solvent. The electrolyte salt includes a combination of cation and anion. Examples of cation include an alkali metal and an alkaline earth metal. Examples of anion include Cl—, Br—, I—, SCN—, $ClO_4$—, $BF_4$—, $PF_6$—, $CF_3SO_3$—, and the like. Specific examples of anion, lithium hexafluorophosphate ($LiPF_6$), lithium tetrafluoroborate ($LiBF_4$), lithium bis(trifluoromethanesulfonyl)imide ($LiN(CF_3SO_2)_2$), lithium bis(pentafluoroethanesulfonyl)imide ($LiN(C_2F_5SO_2)_2$), lithium perchlorate ($LiClO_4$), and the like. With regard to the electrolyte salt concentration, there is no particular limitation insofar as the electrolyte salt can be dissolved in the solvent, and preferably, the lithium ion concentration in the non-aqueous solvent is equal to or more than 0.4 mol/kg and equal to or less than 2.0 mol/kg.

When a polymer electrolyte is used, an electrolytic solution in a gel form obtained by mixing the non-aqueous solvent and the electrolyte is incorporated into a matrix polymer so as to obtain a polymer electrolyte. The matrix polymer is compatible with the non-aqueous solvent. Examples of the matrix polymer include silicone gel, acryl gel, acrylonitrile gel, polyphosphazene modified polymer, polyethylene oxide, polypropylene oxide, a composite polymer, a crosslinked polymer, or a modified polymer thereof, and the like. Examples of the fluorine polymer include polymers, such as polyvinylidene fluoride (PVdF), a copolymer including vinylidene fluoride (VdF) and hexafluoropropylene (HFP) in the repeating units, a copolymer including vinylidene fluoride (VdF) and trifluoroethylene (TFE) in the repeating units, and the like. These polymers may be used individually or two or more polymers may be used in combination.

[Separator]

The separator 23 is formed by, for example, a porous film made of a polyolefin material, such as polypropylene (PP) or polyethylene (PE), or a porous film made of an inorganic material, such as ceramic non-woven fabric. The separator 23 formed by two or more porous films in a laminated structure may be used. Of these, a porous film made of polyethylene or polypropylene may be most effective.

It is generally preferable that the thickness of the separator is adjusted to be equal to or larger than 5 µm and equal to or smaller then 50 µm, and more preferably, to be equal to or larger than 7 µm and equal to or smaller than 30 µm. If the separator is too thick, there is a decrease in the amount of filling of the active material and accordingly a decrease in the battery capacity. Further, the ion conduction property is degraded, so the current property is degraded. Meanwhile, if the separator is too thin, there is a decrease in the mechanical strength of the film.

[Laminated Film]

As shown in FIG. 8, the laminated film 30 used as a packaging member is formed by a multilayer film which has moisture resistance and an insulation property and which includes an outer resin layer 30b and an inner resin layer 30c formed on both surfaces of the metallic foil 30a. With regard to the outer resin layer 30b, in order to achieve good appearance, toughness, flexibility, and the like, nylon (Ny) or polyethylene terephthalate (PET) is used. The metallic foil 30a has an most important role in preventing moisture, oxygen, and light from entering the packaging member so as to protect the battery element as contents, and from the viewpoint of lightweight, good stretchability, low cost, and good processability, aluminum (Al) is most often used. The inner resin layer 30c is a portion which is melted due to heat or ultrasonic waves and heat-sealed, and thus a polyolefin resin material, for example, casted polypropylene (CPP) is frequently used.

[Method of Preparing Secondary Battery]

The secondary battery 2a configured as above is prepared as follows.

[Preparation of Positive Electrode]

A positive electrode active material, a conductor, and a binder are first homogenously mixed to prepare a positive electrode mixture, and the positive electrode mixture is dispersed into a solvent to form a slurry. The slurry is then uniformly applied onto the positive electrode current collector 21b by the doctor blade method, dried to remove the solvent, and subjected to compression molding by a roll pressing machine or the like to form the positive electrode active material layer 21a. It should suffice that the positive electrode active material, the conductor, the binder, and the solvent are uniformly dispersed, and the ratio of mixing is not limited.

Next, the positive electrode terminal 24a is connected to one end of the positive electrode current collector 21b by spot welding or ultrasonic welding. The positive electrode terminal 24a is preferably a metallic foil or a mesh component, but may be metal components insofar as they are electro-chemically and chemically stable and can ensure electrical conduction.

[Preparation of Negative Electrode]

Subsequently, a negative electrode active material, a binder, and if necessary, a conductor are homogeneously mixed to prepare a negative electrode mixture, and the negative electrode mixture is dispersed into a solvent to form a slurry. The slurry is then uniformly applied onto the negative electrode current collector 22b by the doctor blade method or the like, dried to remove the solvent, and subjected to compression molding by a roll pressing machine or the like to form the negative electrode active material layer 22a. It should suffice that the negative electrode active material, the conductor, the binder, and the solvent are uniformly dispersed, and the ratio of mixing is not limited.

Next, the negative electrode terminal 24b is connected to one end of the negative electrode current collector 22b by spot welding or ultrasonic welding. The negative electrode terminal 24b is preferably a metallic foil or a mesh component, but may be metal components insofar as they are electro-chemically and chemically stable and can ensure electrical conduction.

The positive electrode terminal 24a and the negative electrode terminal 24b are preferably led out from the same direction, but may be led out from any direction insofar as they will not cause short-circuit or the like and will not adversely affect battery performance. The locations of attachment and the method of attachment of the positive electrode terminal 24a and the negative electrode terminal 24b are not limited to the above-described example insofar as electrical conduction is ensured.

[Formation of Electrolyte Layer]

With regard to the electrolyte layer, as described above, various materials may be used. Hereinafter, an example of a preparation method will be described. An electrolyte salt, such as lithium hexafluorophosphate ($LiPF_6$), lithium tetrafluoroborate ($LiBF_4$), or the like, is dissolved in a non-aqueous solvent to prepare an electrolytic solution. When a polymer electrolyte is used, a matrix polymer, such as vinylidene fluoride (VdF)-hexafluoropropylene (HFP) copolymer or the like, and an electrolytic solution are mixed with each other to prepare a sol-state electrolyte.

Subsequently, the sol-state electrolyte is applied onto the positive electrode active material layer 21a and the negative electrode active material layer 22a, and cooled to form a polymer electrolyte layer. Alternatively, a diluent solvent composed of dimethyl carbonate (DMC) or the like may be used to prepare a low-viscosity sol. The sol may be then applied onto the positive electrode active material layer 21a and the negative electrode active material layer 22a, and the diluent solvent may be removed by volatilization to form a polymer electrolyte layer.

Next, the positive electrode 21, the separator 23, the negative electrode 22, and the separator 23 are stacked sequentially to obtain a laminate. The laminate is then wound by multiple turns in the longitudinal direction to prepare the battery element 20.

Next, the laminated film 30 is used in which a recess 31 is formed from the inner resin layer 30c to the outer resin layer 30b by drawing, and as shown in FIG. 7B, the battery element 20 is contained in the recess 31 and packaged with the laminated film 30. In this case, the battery element 20 is packaged with the laminated film 30 such that the inner resin layers 30c of the laminated film 30 are opposite each other. Subsequently, the edges of the opening of the recess 31 of the laminated film 30 are heat-sealed. Thus, the secondary battery 2a is prepared.

[Production of Battery Pack]

Figure 10:
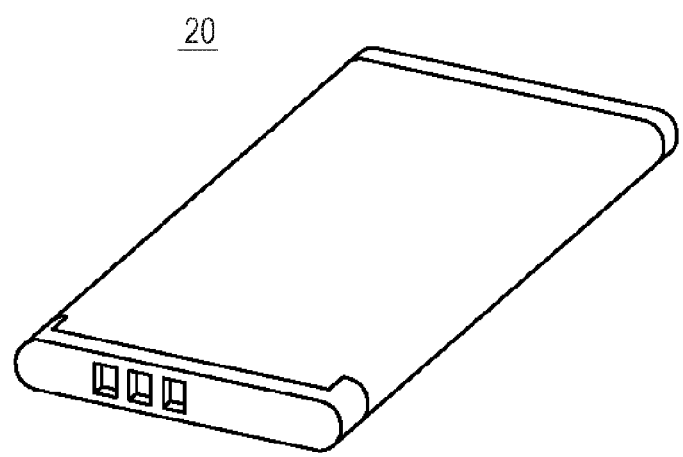
FIG. 10 is a perspective view showing the electrode configuration of the battery pack according to the first embodiment.

A plurality of secondary batteries formed in the same manner as the secondary battery 2a are connected in series to obtain the assembled battery 2. Then, the plus side of the assembled battery 2 is connected to the plus terminal 5a of the circuit board 3, and the minus side of the assembled battery 2 is connected to the minus terminal 5b of the circuit board 3. Finally, the assembled battery 2 and the circuit board 3 are contained in a packaging case 40 or the like. In this case, the plus terminal 5a and the minus terminal 5b of the circuit board 3 and other terminals (contacts) for communication with the electronic apparatus are led out from the battery pack 1. Thus, the battery pack 1 having an appearance shown in FIG. 10 is prepared. The plus terminal 5a and the minus terminal 5b which are exposed through the portions of the battery pack 1 are connected to the plus terminal and the minus terminal of an electronic apparatus or the like, so charging/discharging is carried out.

(2) Second Embodiment

In a second embodiment, an example where discharge control is performed in a battery pack, and charge control is performed by an electronic apparatus (charger) will be described.

Figure 11:
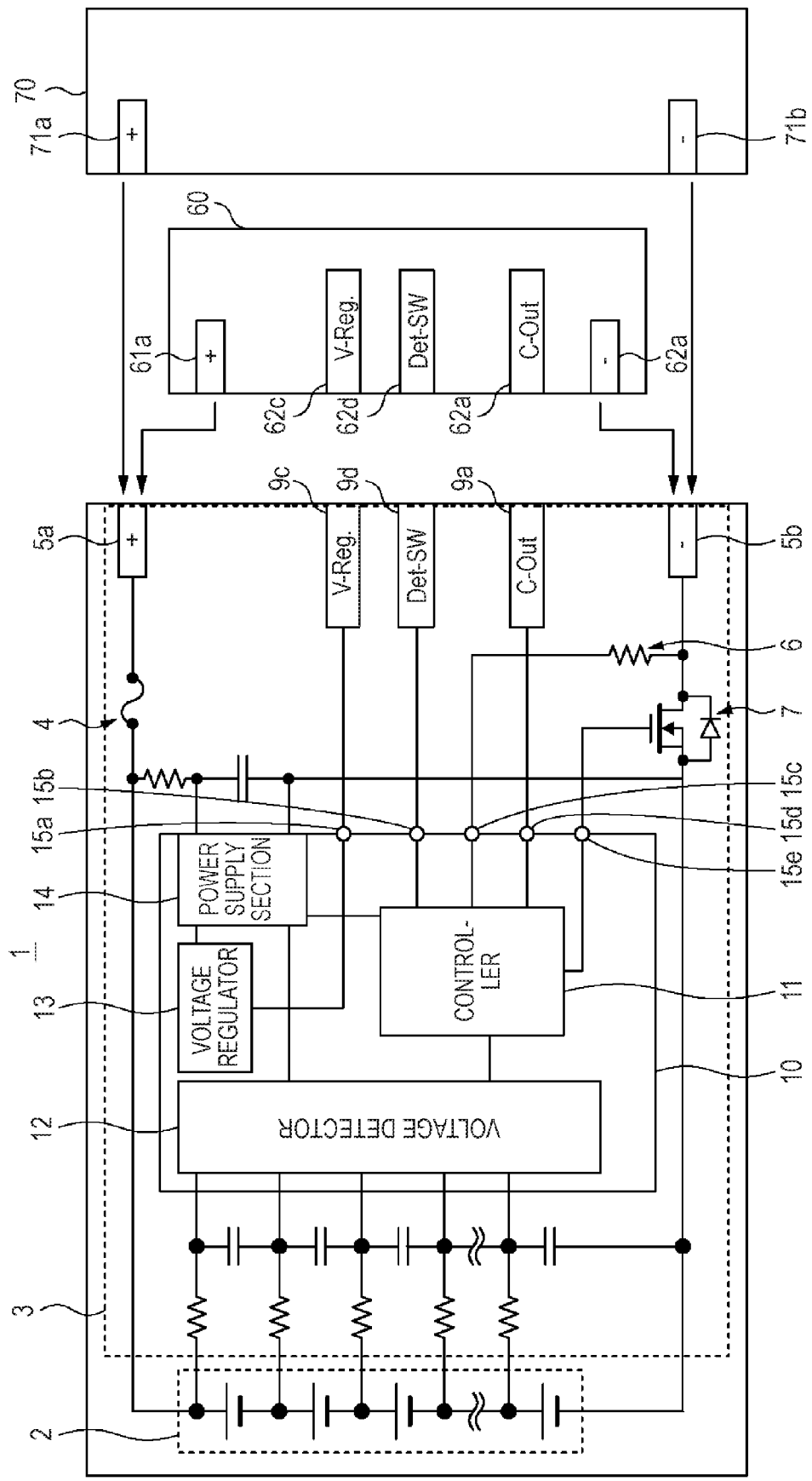
FIG. 11 is a block diagram showing an example of the circuit configuration of a battery pack according to a second embodiment.

FIG. 11 shows the configuration of a battery pack 50 according to the second embodiment. FIG. 11 shows a charger 60 and an electronic apparatus 70 which are connected to the battery pack 1. In the battery pack 50, the corresponding portions to those in the battery pack 1 of FIGS. 1 to 3 are represented by the same reference numerals.

In the battery pack 50 of the second embodiment, with regard to discharge control, the discharge control FET 7 is provided, and control is performed in the battery pack 50. With regard to charge control, an overcharge detection signal is output to the charger 60, and control is performed by the control circuit of the charger. The protection IC 10 operates in the voltage detector mode since a predetermined voltage is input to the controller 11. If it is detected from the overdischarge detection terminal 15e that the voltage is equal to or lower than the overdischarge voltage, the overdischarge detection signal is output to the discharge control FET 7 so as to control the discharge current.

With this configuration, with regard to discharge control, it may be impossible to use the configuration in which the voltage of each of the secondary batteries 2a to 2n is output from the overdischarge detection terminal 15e constantly or for every predetermined time, so overdischarge control is performed. With regard to charge control, a method may be used in which the control circuit of the charger monitors the voltage of each of the secondary batteries 2a to 2n, and controls the charge current after the voltage has reached the overcharge voltage.

(3) Third Embodiment

In a third embodiment, description will be provided for an example where, in addition to overcharge, overdischarge, and overcurrent, charge/discharge control by battery temperature is performed in a battery pack and the battery residual capacity is displayed on an electronic apparatus.

Figure 12:
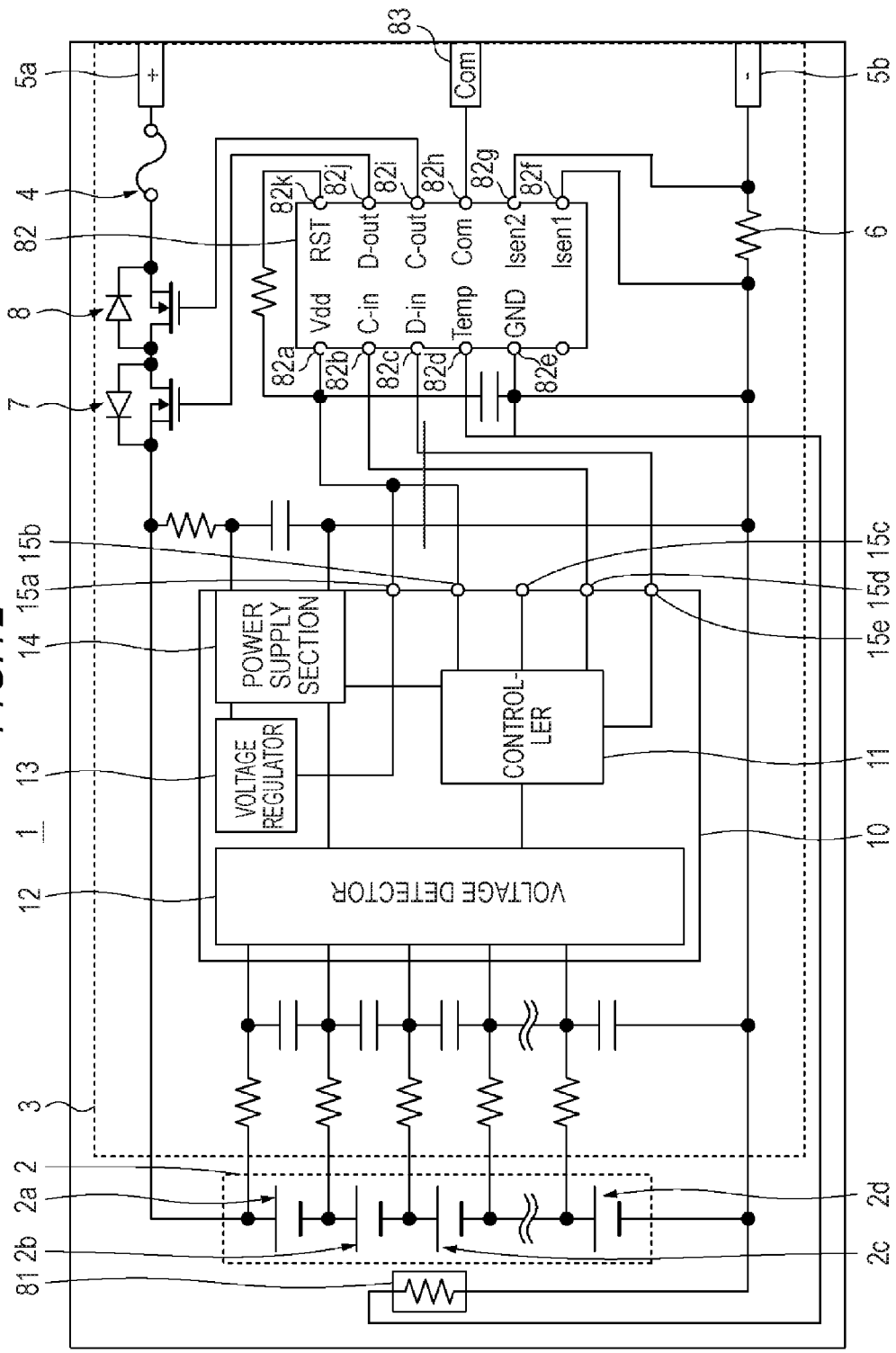
FIG. 12 is a block diagram showing an example of the circuit configuration of a battery pack according to a third embodiment.

FIG. 12 shows the configuration of a battery pack 80 according to the third embodiment. FIG. 12 also shows a charger 60 and an electronic apparatus 70 which are connected to the battery pack 1. In the battery pack 50, the corresponding portions to those in the battery pack 1 of FIG. 1 are represented by the same reference numerals.

The battery pack 80 is further provided with a thermistor 81, a microcomputer 82, and a communication terminal 83.

The thermistor 81 is a detection element which detects the temperature of each of the secondary batteries 2a to 2n of the assembled battery 2. If the temperature of each of the secondary batteries 2a to 2n is detected by the thermistor 81, the thermistor 81 has a resistance value corresponding to the temperature of each of the secondary batteries 2a to 2n.

The microcomputer 82 operates when the voltage output from the voltage regulator 13 of the protection IC 10 is input to a terminal 82a. A charge detection signal output from the overcharge detection terminal 15d is input to a terminal 82b of the microcomputer 82. An overdischarge detection signal output from the overdischarge detection terminal 15e is input to a terminal 82c of the microcomputer 82. The resistance value of the thermistor 81 is input to a terminal 82d of the microcomputer 82. The plus-side voltage and the minus-side voltage of the overcurrent state detection resistor 6 are respectively input to terminals 82f and 82g of the microcomputer 82. Information about residual battery capacity or the like is output from a terminal 82h of the microcomputer 82 to the electronic apparatus or the like. A charge control signal is output from a terminal 82i of the microcomputer 82 to the charge control FET 8. A discharge control signal is output from a terminal 82j of the microcomputer 82 to the discharge control FET 7. A predetermined voltage for resetting the operation of the microcomputer 82 is input to a terminal 82k of the microcomputer 82.

The microcomputer 82 detects the resistance value of the thermistor 81, and obtains the temperature of each of the secondary batteries 2a to 2n from the detected resistance value. The microcomputer 82 stores a table in which the resistance value of the thermistor 81 is stored in association with the temperature of each of the secondary batteries 2a to 2d.

The microcomputer 82 calculates the residual battery capacity and outputs the calculated residual battery capacity to the electronic apparatus or the like, so the residual capacity can be displayed on a display unit provided in the electronic apparatus in numerals or figures. Thus, when the electronic apparatus is used, or during charging, the residual capacity of the battery pack 80 can be easily found out. The microcomputer 82 can calculate the residual capacity from the input voltage of each of the secondary batteries 2a to 2n. Further, in order to more accurately calculate the residual capacity, the residual capacity which is calculated from voltage and current may be further weighted and added in accordance with the state of each of the secondary batteries 2a to 2n, or the coefficient according to the temperature of each of the secondary batteries 2a to 2n can be used. The microcomputer 82 stores a table in which a predetermined formula for computation, or voltage, current, and temperature in association with the residual capacity.

The microcomputer 82 detects overcurrent or the like while a program is being executed, so the supply of power supply voltage to the terminal 82k is cut off. Then, when the power supply voltage is again supplied to the microcomputer 82, the microcomputer 82 is reset to the initial state. When this happens, the microcomputer 82 operates from the beginning of the program. In this case, if necessary, data which is temporarily stored in the memory may be reset.

The communication terminal 83 is used to output information about the residual capacity from the microcomputer 82 to the electronic apparatus or the like. Further, when two-way communication with the electronic apparatus or the like is performed, the communication terminal 83 may be used to receive information from the electronic apparatus.

With the configuration of the battery pack 80 shown in FIG. 11, the quality and safety of the battery pack 80 can be further improved.

Although the embodiments have been specifically described, the invention is not limited to the foregoing embodiments, and various modifications may be made without departing from the technical spirit and scope of the application.

In the foregoing embodiments, the numerical values are just examples, and different numerical values may be used as occasion demands.

The protection IC is not limited to the above-described configuration, and various configuration may be used in accordance with functions to be required insofar as the functions may be switched in accordance with whether or not a predetermined voltage is input to the controller.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An integrated circuit comprising:
a voltage detection means for detecting a first voltage to be applied between a positive electrode and a negative electrode of one or a plurality of secondary batteries;
a power supply means for generating a second voltage including a predetermined voltage;
a first input terminal to which a third voltage value according to the value of a current flowing in the secondary battery is input;
a second input terminal which receives an output from the voltage detection means;
a mode switch terminal, wherein the first input terminal, the second input terminal, and the mode switch terminal are different terminals; and
a control means, including the first input terminal, the second input terminal, and the mode switch terminal, for outputting from the control means (i) an overcharge detection signal or (ii) an overdischarge detection signal, in accordance with the first voltage detected by the voltage detection means, while the predetermined voltage is input to the mode switch terminal from the power supply means causing the integrated circuit to operate in a voltage detector mode, and for outputting from the control means (iii) a charge control signal or (iv) a discharge control signal, in accordance with (v) the first voltage detected by the voltage detection means or (vi) the third voltage value to be input to the first input terminal, while the predetermined voltage is not input to the mode switch terminal from the power supply means causing the integrated circuit to operate in a protection mode,
wherein the control means is for outputting the overcharge detection signal or the charge control signal with a changed output level in response to an overcharge state or a charge overcurrent state being detected, and
wherein the control means is for outputting the overdischarge detection signal or the discharge control signal with the changed output level in response to an overdischarge state or a discharge overcurrent state being detected.

2. The integrated circuit according to claim 1,
wherein the control means is for controlling the second voltage of the power supply means so that power consumption is substantially zero in response to a first predetermined time elapsing after the overdischarge state or the discharge overcurrent state is detected.

3. The integrated circuit according to claim 2,
wherein the control means is for changing the output level of the overdischarge detection signal or the discharge control signal and restoring the second voltage of the power supply means in response to a second predetermined time elapsing after the control means has controlled the second voltage of the power supply means such that power consumption is substantially zero and the first voltage detected by the voltage detection means falling within a predetermined range.

4. A battery pack comprising:
an assembled battery configured to have one or a plurality of secondary batteries; and
a protection circuit configured to have an integrated circuit for controlling charge/discharge of the secondary battery and first and second external connection terminals,
wherein the integrated circuit includes
a voltage detection means for detecting a first voltage to be applied between a positive electrode and a negative electrode of one or a plurality of secondary batteries,
a power supply means for generating a second voltage including a predetermined voltage,
a first input terminal to which a third voltage value according to the value of a current flowing in the secondary battery is input,
a second input terminal which receives an output from the voltage detection means,
a mode switch terminal, wherein the first input terminal, the second input terminal, and the mode switch terminal are different terminals, and
a control means, including the first input terminal, the second input terminal, and the mode switch terminal, for outputting from the control means (i) an overcharge detection signal or (ii) an overdischarge detection signal, in accordance with the first voltage detected by the voltage detection means, while the predetermined voltage is input to the mode switch terminal from the power supply means causing the integrated circuit to operate in a voltage detector mode, and for outputting from the control means (iii) a charge control signal or (iv) a discharge control signal, in accordance with (v) the first voltage detected by the voltage detection means or (vi) the third voltage value to be input to the input terminal, while the predetermined voltage is not input to the mode switch terminal from the power supply means causing the integrated circuit to operate in a protection mode,
wherein the control means is for outputting the overcharge detection signal or the charge control signal with a changed output level in response to an overcharge state or a charge overcurrent state being detected, and
wherein the control means is for outputting the overdischarge detection signal or the discharge control signal with the changed output level in response to an overdischarge state or a discharge overcurrent state being detected.

5. The battery pack according to claim 4, further comprising:
a first output terminal configured to output the charge control signal to the outside, and a second output terminal configured to output the discharge control signal to the outside, and
a charge controller configured to control a charge current in accordance with the charge control signal, a discharge controller configured to control a discharge current in accordance with the discharge control signal, and a resistor configured to detect a current value.

6. The battery pack according to claim 5,
wherein the control means is for outputting the overdischarge detection signal or the discharge control signal with its output level changed, such that the charge current and the discharge current are cut off, in response to the overdischarge state or the discharge overcurrent state being detected.

7. The battery pack according to claim 6,
wherein the control means is for controlling the second voltage of the power supply means so that power consumption of the integrated circuit is substantially zero in response to a first predetermined time elapsing after the overdischarge state or the discharge overcurrent state has been detected.

8. The battery pack according to claim 7,
wherein the control means is for changing the output level of the charge control signal or the output level of the discharge control signal to restore the second voltage of the power supply means such that a chargeable/dischargeable state is set in response to a second predetermined time elapsing after the second voltage of the power supply means has been controlled such that power consumption of the integrated circuit is substantially zero and the first voltage detected by the voltage detection means falls within a predetermined range.

9. The battery pack according to claim 7,
wherein the control means is for controlling the second voltage of the power supply means until the first and second external connection terminals are connected to or disconnected from an external apparatus in response to a second predetermined time elapsing after the second voltage of the power supply means has been controlled such that power consumption of the integrated circuit is substantially zero and the first voltage detected by the voltage detection means not falling within a predetermined range.

10. An integrated circuit comprising:
a voltage detector configured to detect a first voltage to be applied between a positive electrode and a negative electrode of one or a plurality of secondary batteries;
a power supplier configured to generate a second voltage including a predetermined voltage;
a first input terminal to which a third voltage value according to the value of a current flowing in the secondary battery is input;
a second input terminal which receives an output from the voltage detector;
a mode switch terminal, wherein the first input terminal, the second input terminal, and the mode switch terminal are different terminals; and
a controller, including the first input terminal, the second input terminal, and the mode switch terminal, programmed to output from the controller (i) an overcharge detection signal or (ii) an overdischarge detection signal, in accordance with the first voltage detected by the voltage detector, while the predetermined voltage is input to the mode switch terminal from the power supplier causing the integrated circuit to operate in a voltage detector mode, and to output from the controller (iii) a charge control signal or (iv) a discharge control signal, in accordance with (v) the first voltage detected by the voltage detector or (vi) the third voltage value to be input to the first input terminal, while the predetermined voltage is not input to the mode switch terminal from the power supplier causing the integrated circuit to operate in a protection mode,
wherein the controller is programmed to output the overcharge detection signal or the charge control signal with a changed output level in response to an overcharge state or a charge overcurrent state being detected, and
wherein the controller is programmed to output the overdischarge detection signal or the discharge control signal with the changed output level in response to an overdischarge state or a discharge overcurrent state being detected.

11. A battery pack comprising:
an assembled battery configured to have one or a plurality of secondary batteries; and
a protection circuit configured to have an integrated circuit for controlling charge/discharge of the secondary battery and first and second external connection terminals,
wherein the integrated circuit includes
a voltage detector configured to detect a first voltage to be applied between a positive electrode and a negative electrode of one or a plurality of secondary batteries,
a power supplier configured to generate a second voltage including a predetermined voltage,
a first input terminal to which a third voltage value according to the value of a current flowing in the secondary battery is input,
a second input terminal which receives an output from the voltage detection means,
a mode switch terminal, wherein the first input terminal, the second input terminal, and the mode switch terminal are different terminals, and
a controller, including the first input terminal, the second input terminal, and the mode switch terminal, programmed to output from the controller (i) an overcharge detection signal or (ii) an overdischarge detection signal, in accordance with the first voltage detected by the voltage detector, while the predetermined voltage is input to the mode switch terminal from the power supplier causing the integrated circuit to operate in a voltage detector mode, and to output from the controller (iii) a charge control signal or (iv) a discharge control signal, in accordance with (v) the first voltage detected by the voltage detector or (vi) the third voltage value to be input to the first input terminal, while the predetermined voltage is not input to the mode switch terminal from the power supplier causing the integrated circuit to operate in a protection mode,
wherein the controller is programmed to output the overcharge detection signal or the charge control signal with a changed output level in response to an overcharge state or a charge overcurrent state being detected, and
wherein the controller is programmed to output the overdischarge detection signal or the discharge control signal with the changed output level in response to an overdischarge state or a discharge overcurrent state being detected.

* * * * *